United States Patent Office 2,966,961
Patented Jan. 3, 1961

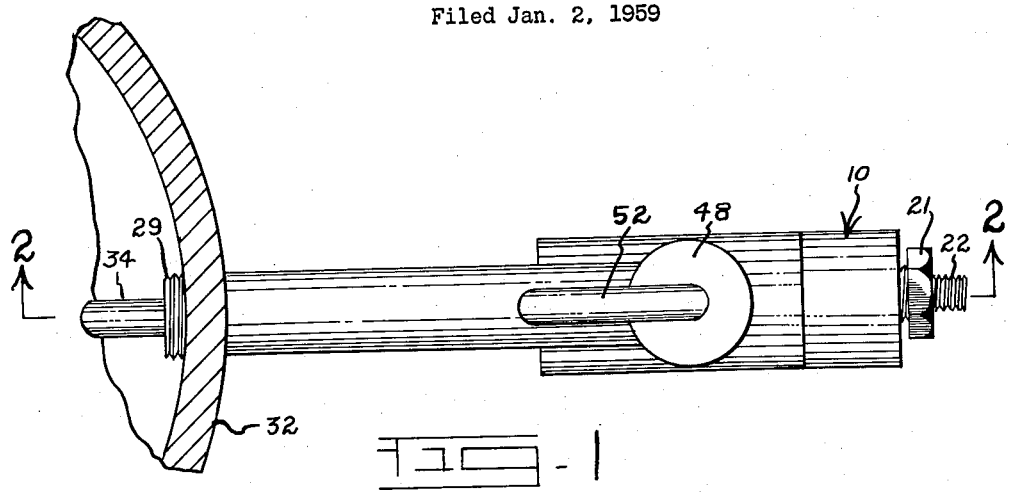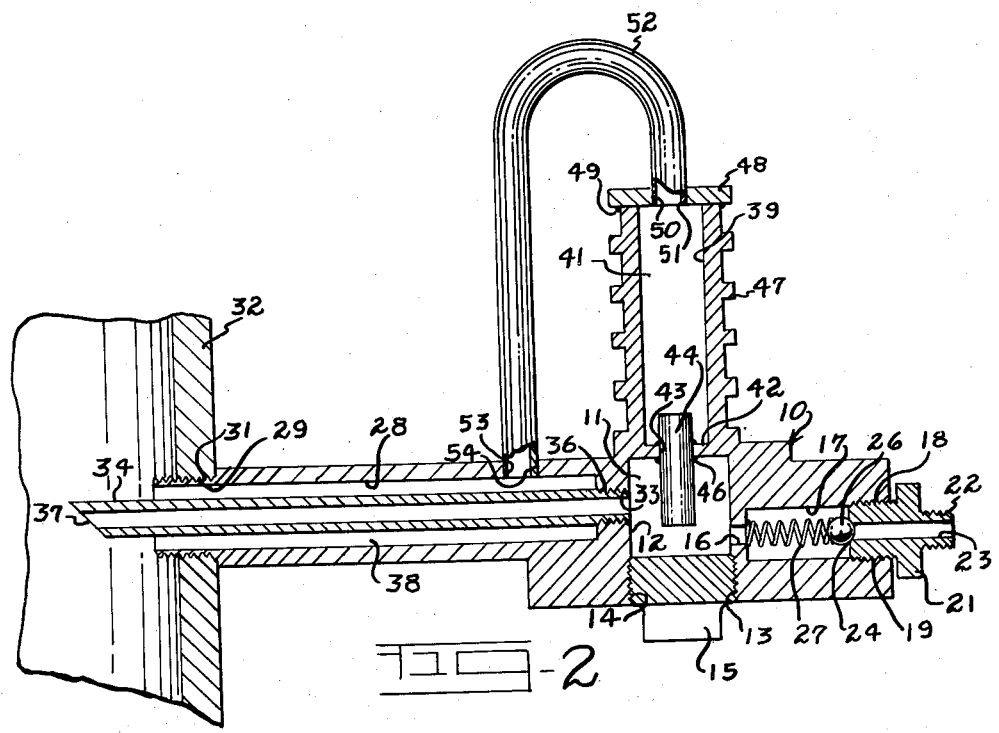

2,966,961

LUBRICANT DISTRIBUTOR

William A. Green, 426 S. 15th St., Columbus, Miss.

Filed Jan. 2, 1959, Ser. No. 784,630

5 Claims. (Cl. 184—50)

This invention relates to a lubricant distributor and more particularly to apparatus for injecting lubricant in finely divided condition into a steam conduit whereby the lubricant is transferred into direct contact with the working parts of steam actuated mechanisms, such as steam engines, steam pumps, steam operated compressors and steam hammers.

An object of my invention is to provide apparatus for injecting lubricant in finely divided condition into a steam conduit of the character designated in which the lubricant is introduced at its maximum atomization.

Another object of my invention is to provide apparatus for injecting lubricant in finely divided condition into a steam conduit of the character designated in which the lubricant introduced passes through the apparatus in a substantially straight line flow thereby eliminating the hindrance caused by sharp angular changes in direction of flow of the lubricant between the point of ebullition and expansion and the point of delivery to the steam conduit, thus avoiding separation of the lubricant from the steam by the eddy currents formed by such sharp angular changes in direction.

Another object of my invention is to provide apparatus for injecting lubricant in finely divided condition into a steam conduit of the character designated in which the steam is introduced into direct contact with the lubricant in the expansion chamber at the point the condensate is introduced into the expansion chamber and the lubricant in finely divided condition is removed from the expansion chamber in substantially straight line flow from the point of maximum ebullition, thereby delivering the lubricant to the steam conduit at maximum expansion and atomization.

Another object of my invention is to provide apparatus for injecting lubricant in finely divided condition into a steam conduit of the character designated in which the expansion chamber is of a volume substantially greater than the volume occupied by the lubricant introduced therein, whereby the velocity of the lubricant is reduced while it is exposed to the direct heat of the live steam.

A further object of my invention is to provide apparatus of the character designated in which the condensate is introduced into the hot lubricant at a point below the surface thereof, thereby bringing about maximum ebullition adjacent the point the lubricant is removed from the expansion chamber.

A further object of my invention is to provide apparatus for injecting lubricant in finely divided condition into a steam conduit in which the apparatus has a minimum of threaded connections, the main body portion, including the expansion chamber, condenser chamber, the conduit for supplying lubricant and the conduit which is secured to the steam conduit being formed integrally, thereby eliminating the problem of leakage at the threaded connections, which is brought about by excessive vibration.

A further object of my invention is to provide apparatus of the character designated which shall include an inspection port which is in position to permit easy inspection and cleaning of the apparatus.

A further object of my invention is to provide apparatus of the character designated in which control means is provided outside the high heat zone to limit the flow of the lubricant to a single direction, thereby eliminating over-heating and sticking of the control means.

A further object of my invention is to provide apparatus for injecting lubricant in finely divided condition into a steam conduit in which deterioration, corrosion and oxidation of the internal parts of the apparatus is reduced to a minimum.

A still further object of my invention is to provide apparatus of the character designated which shall be simple of construction, economical of manufacture and which shall be readily applied to conventional type steam actuated apparatus due to the fact that the over-all size and weight of the apparatus is reduced to a minimum.

Heretofore in the art to which my invention relates various forms of apparatus have been devised for lubricating the internal friction areas of steam engines and the like, such as the apparatus disclosed in the patent to Sharp, No. 2,657,764, issued on November 3, 1953, and entitled "Lubricant Distributor and Economizer." Also, manufacturers of steam cylinder lubricants have compounded various forms of lubricants in an attempt to obtain more effective atomization. While such prior art compounds do improve the atomization to a certain extent, they have the disadvantage of reducing the heat resistance of the lubricant and soften the cast iron cylinder walls by penetration. Although prior art apparatus has been helpful in the application of lubricant to the working parts of steam actuated apparatus, their effectiveness has been limited due to the fact that the lubricant becomes separated from the steam between the point of ebullition and the point of delivery into the steam supply conduit. Also, with prior art apparatus with which I am familiar, the lubricant is separated from the steam by the eddy currents formed by sharp angular changes in direction of the lubricant flow, such sharp changes occurring between the point of maximum ebullition and the point of discharge into the steam supply line.

To overcome the above and other difficulties, I have devised a lubricant distributor in which a maximum surface area of the lubricant is exposed to direct steam temperature, thereby bringing about instant expansion. A constant supply of condensate is supplied beneath the surface of the hot lubricant whereby maximum ebullition and atomization is obtained. The lubricant is removed from the expansion chamber at the point of maximum atomization and ebullition in unrestricted straight line flow to the steam supply conduit whereby there are no abrupt changes in direction to cause separation of the lubricant prior to introduction into the steam supply conduit.

Apparatus embodying features of my invention is illustrated in the accompanying drawing, forming a part of this application, in which:

Fig. 1 is a top plan view of the lubricant distributor showing the same connected to a steam supply conduit, the steam supply conduit being shown in section; and, Fig. 2 is a vertical sectional view taken generally along the line 2—2 of Fig. 1.

Referring now to the drawing for a better understanding of my invention, I show a base fitting 10 which is of elongated hollow construction, as shown. An expansion chamber 11 is provided intermediate the ends of the base fitting 10 by boring a substantially vertically extending opening 12 through the bottom of the base fitting 10, as shown in Fig. 2. The outer end of the opening 12 is provided with internal threads 13 for receiving the external threads 14 of an inspection plug 15.

Communicating with one side of the expansion chamber 11 is a passageway 16 for supplying lubricant to the expansion chamber. The amount of lubricant supplied to the expansion chamber 11 depends upon the over-all area of the rubbing surfaces to be protected. Also, the amount of lubricant required varies with the speed at which the apparatus operates. The passageway 16 is provided with an enlarged bore 17 at the outer end thereof, as shown. The outer end of the bore 17 is provided with internal threads 18 for receiving external threads 19 of an adaptor coupling member 21. Suitable external threads 22 are provided on the coupling member 21 for attaching a lubricant delivery tube, not shown. The lubricant delivery tube is attached to a force feed lubricator, which is in the form of a suitable pump for constantly introducing a predetermined amount of lubricant into the expansion chamber 11.

The coupling member 21 is provided with a passageway 23 for introducing lubricant into the bore 17 and thence through the remainder of the passageway 16 into the expansion chamber 11. The inner end of the coupling member 21 adjacent the passageway 23 is provided with a bevelled surface 24 for receiving the adjacent surface of a ball 26 which forms a check valve and limits the direction of flow of the lubricant to a single direction which is from the passageway 23 to the expansion chamber 11. The ball 26 is urged toward the bevelled surface 24 by a compression spring 27, thereby assuring that the ball 26 is seated properly in the event the pressure within the bore 17 exceeds the pressure within the passageway 23.

The end of the base fitting 10 opposite the bore 17 is provided with an elongated bore 28. External threads 29 are provided adjacent the end of the base fitting having the bore 28. The threads 29 are disposed to engage an internally threaded opening 31 provided in a steam supply conduit 32, whereby the bore 28 is in direct communication with the steam supply conduit 32.

A threaded opening 33 is provided in the side of the expansion chamber 11 opposite the passageway 16. Extending longitudinally through the bore 28 is an elongated ejector tube 34 having external threads 36 at the inner end thereof disposed to engage the internally threaded opening 33, thereby communicating the ejector tube 34 with the expansion chamber 11. The outer end of the ejector tube 34 is bevelled as at 37 and is directed relative to the direction of steam flow through the conduit 32 whereby a slight suction is created to aid in the removal of the lubricant in finely divided condition at the discharge end of the ejector tube. As shown in Fig. 2, the outer wall of the ejetcor tube 34 is spaced from the inner wall of the bore to define a passageway 38 which is in communication with the steam supply conduit 32.

The upper end of the base fitting 10 is provided with a vertical bore 39 to define a condenser chamber 41 which is superimposed on the expansion chamber 11. As shown in Fig. 2, the condenser chamber 41 is separated from the expansion chamber 11 by a partition 42 which is an integral part of the base fitting 10. An opening 43 is provided through the partition 42 for receiving an overflow tube 44 whereby the condenser chamber 41 is in communication with the expansion chamber 11. The overflow tube 44 is secured to the partition 42 by suitable means, such as by welding at 46. As shown in Fig. 2, the upper end of the overflow tube 44 terminates above the partition 42 whereby a condensate reservoir is provided adjacent the bottom of the condenser chamber 42. In actual practice, I have found that by positioning the upper end of the overflow tube 44 approximately one-fourth of an inch from the partition 42 provides a suitable reservoir for the condensate whereby a constant supply of the condensate overflows into the overflow tube 44 and thence into the expansion chamber 11. The lower end of the overflow tube 44 terminates at a point below the lower inner surface of the ejector tube 34 whereby the condensate is introduced below the surface of the hot lubricant contained in the expansion chamber 11. The space above the surface of the hot lubricant in the expansion chamber 11 provides ample space for expansion, ebullition and atomization of the lubricant just prior to removal by the ejector tube 34. Suitable heat exchanger vanes 47 are provided on the outer surface of the base fitting 10 surrounding the condenser chamber 41, thereby aiding in the condensation of the steam within the condenser chamber.

The upper end of the condenser chamber 41 is closed by a cover member 48 which is secured to the upper end of the base fitting 10 by welding as at 49, thereby providing a rigid connection. A suitable opening 50 is provided in the cover member 48 for receiving the discharge end 51 of a conduit 52. The other end or inlet end 53 of the conduit 52 fits in a suitable opening 54 provided in the base fitting 10 adjacent the inner end of the bore 28, as shown in Fig. 2. That is, the pipe 52 defines a passageway which communicates the passageway 38 defined between the ejector tube and the bore 28 with the upper portion of the condenser chamber 41. By introducing the steam at the top of the condenser chamber 41, I eliminate entirely the problem of water, air or vacuum locks.

From the foregoing description, the operation of my improved apparatus will be readily understood. The lubricant is continuously introduced at a controlled rate into the passageway 23 by a suitable force feed lubricator whereby the ball 26 is unseated and the lubricant passes through the passageway 16 into one side of the expansion chamber 11. In the event the force feed lubricator is stopped, the ball 26 reseats against the bevelled surface 24 by the action of the compression spring 27, thereby preventing back flow of the fluid and steam through the passageway 23 to the force feed lubricator.

Steam passes from the supply conduit 32 through the passageway 38 defined between the ejector tube 34 and the bore 28 and thence through the tube 52 to the upper end of the condenser chamber 41. The condensate in the condenser chamber 41 collects around the upper end of the overflow tube 44 and then flows constantly into the upper end of the overflow tube and is then discharged through the lower end of the overflow tube. In view of the fact that the lower end of the overflow tube 44 is below the surface of the hot lubricant within the expansion chamber 11, maximum ebullition is obtained at this point. Also, steam is continuously introduced through the overflow tube 44 into the expansion chamber 11 at this point.

In view of the fact that the inlet end of the ejector tube 34 is positioned adjacent the point of maximum ebullition, the lubricant in finely divided condition is continuously discharged through the ejector tube 34 into the conduit 32. The space above the lubricant within the expansion chamber 11 provides ample room for expansion and atomization of the lubricant prior to being discharged through the ejector tube 34. The hot steam and condensate passing through the overflow tube 44 thus contact the lubricant and bring about maximum ebullition, expansion and atomization adjacent the point of removal from the expansion chamber. Also, since the lubricant in finely divided condition is removed in substantially straight line flow from the expansion chamber 11, there is no separation of the lubricant as it passes from the expansion chamber 11 to the steam supply conduit 32.

The inspection port 14 provides easy inspection of the expansion chamber 11, the lower end of the overflow tube 44 and the inner ends of the passageway 16 and ejector tube 34, respectively. Accordingly, the apparatus may be inspected and cleaned in a minimum of time and without removing the same from the steam conduit 32.

From the foregoing, it will be seen that I have devised an improved lubricant distributor in which all of the lubricant introduced into the steam supply line is in a finely divided state, due to the fact that there is no separation of the lubricant after the point of maximum expansion, ebullition and atomization. Also, by introducing the steam into direct contact with the lubricant in the expansion chamber, there is a more effective transfer of heat from the steam to the lubricant. Furthermore, by constructing the ejector tube 34, the tube 52 and the overflow tube 44 of stainless steel or other non-corrosive material, deterioration, corrosion and oxidation is eliminated, thus assuring a constant supply of clean water for most effective ebullition and atomization, as well as long trouble-free operation of the apparatus.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. Apparatus for injecting lubricant in finely divided condition into a steam conduit comprising an expansion chamber, a condenser chamber mounted at an elevation above said expansion chmber, an ejector tube communicating at one end with one side of said expansion chamber and having the other end thereof adapted to project inwardly of the steam conduit, a housing spaced from and incasing said ejector tube with one end of said housing adapted for connection to the steam conduit to define a first passageway located between said ejector tube and said housing for the ingress of steam when said one end of the housing is connected to the steam conduit, means defining a second fluid passageway communicating said first fluid passageway with the upper portion of the condenser chamber whereby steam is supplied to said condenser chamber, a third fluid passageway communicating the side of said expansion chamber opposite said ejector tube with a forced feed lubricator and in position for the lubricant to flow directly across the expansion chamber to the ejector tube, and an overflow tube communicating said condenser chamber with said expansion chamber with the inlet of said overflow tube located above the bottom of said condenser chamber to define a reservoir for condensate adjacent the bottom of said condenser chamber and the outlet of said overflow tube located within said expansion chamber between said third fluid passageway and said ejector tube whereby the condensate is introduced into direct contact with the lubricant as it passes in substantially straight line flow from said third fluid passageway to said ejector tube and the lubricant is delivered to the steam conduit at its maximum ebullition and atomization.

2. Apparatus for injecting lubricant in finely divided condition into a steam conduit as defined in claim 1 in which a removable inspection port is provided at the bottom of the expansion chamber in position to expose for inspection and cleaning the expansion chamber, the discharge end of the overflow tube, the discharge end of the third passageway and the inlet of the ejector tube.

3. Apparatus for injecting lubricant in finely divided condition into a steam conduit comprising a vertical expansion chamber, a condenser chamber mounted above and in vertical alignment with said expansion chamber, an ejector tube communicating at one end with one side of said expansion chamber and having the other end thereof adapted to project inwardly of the steam conduit, a housing spaced from and incasing said ejector tube with one end of said housing adapted for connection to the steam conduit to define a first passageway located between said ejector tube and said housing for the ingress of steam when said one end of the housing is connected to the steam conduit, means defining a second fluid passageway communicating said first fluid passageway with the upper portion of the condenser chamber whereby steam is supplied to said condenser chamber, a third fluid passageway communicating the side of said expansion chamber opposite said ejector tube with a forced feed lubricator and in position for the lubricant to flow in a generally straight line from said third passageway directly across said expansion chamber to said ejector tube, and a generally vertically extending overflow tube communicating said condenser chamber with said expansion chamber with the upper end of said overflow tube positioned above the bottom of said condenser chamber to define a reservoir for condensate adjacent the bottom of said condenser chamber and the lower end of said overflow tube terminating at a point below the lower inner surface of the ejector tube to introduce the condensate below the surface of the lubricant in the expansion chamber whereby ebullition is effected and the lubricant is delivered to the ejector tube at maximum expansion and atomization.

4. Apparatus for injecting lubricant in finely divided condition into a steam conduit comprising a base fitting of elongated hollow construction and having an integrally formed vertical expansion chamber intermediate the ends thereof, means at one end of said base fitting connecting the base fitting to a steam conduit, means at the other end of said base fitting connecting and communicating one side of said expansion chamber to a force feed lubricator, an ejector tube secured at one end to the base fitting and communicating with the side of said expansion chamber opposite the side thereof which is in communication with the force feed lubricator, said ejector tube extending through and being in spaced relation to the means connecting the base fitting to the steam conduit in position for the lubricant to flow in a generally straight line from the means connecting the force feed lubricator to the expansion chamber directly through the expansion chamber and the ejector tube to the steam conduit and a first fluid passageway is defined between the outer surface of the ejector tube and the means connecting the base fitting to the steam conduit, said first fluid passageway being in communication with said steam conduit, a condenser chamber superimposed on said expansion chamber and forming an integral part of said base fitting, means separating said expansion chamber from said condenser chamber, means defining a second fluid passageway communicating said first fluid passageway with the upper portion of said condenser chamber whereby steam is supplied to said condenser chamber, and a generally vertically disposed overflow tube extending through said means separating the expansion chamber from the condenser chamber and communicating said condenser chamber with said expansion chamber with the upper end of said overflow tube positioned above the bottom of said condenser chamber to define a reservoir for condensate adjacent the bottom of said condenser chamber, and the lower end of said overflow tube located within said expansion chamber between said means connecting the force feed lubricator to the expansion chamber and said ejector tube whereby the condensate flows through said overflow tube to the expansion chamber and ebullition of the lubricant is effected within the expansion chamber and the lubricant in finely divided state is delivered directly to the steam conduit through the ejector tube at maximum expansion and atomization.

5. Apparatus for injecting lubricant in finely divided condition into a steam conduit comprising an expansion chamber, a condenser chamber mounted at an elevation above said expansion chamber, an ejector tube communicating at one end with one side of said expansion chamber and having the other end thereof adapted to project inwardly of the steam conduit, a housing spaced from and encasing said ejector tube with one end of said housing adapted for connection to the steam conduit to define a first passageway located between said ejector tube and said housing for the ingress of steam when said one end of the housing is connected to the steam conduit, means defining a second fluid passageway communicating said first fluid passageway with the upper portion of the condenser chamber whereby steam is supplied to said condenser chamber, a third fluid passageway communicating the side of said expansion chamber opposite said ejector tube with a forced feed lubricator and in position for the lubricant to flow directly across the expansion chamber to the ejector tube, and means communicating said condenser chamber with said expansion chamber between said third fluid passageway and said ejector tube whereby the condensate and steam is introduced into direct contact with the lubricant as it passes in substantially straight line flow from said third fluid passageway to said ejector tube and the lubricant is delivered to the steam conduit at its maximum ebullition and atomization.

References Cited in the file of this patent

UNITED STATES PATENTS

| | | |
|---|---|---|
| 501,627 | Queen | July 18, 1893 |
| 1,905,136 | Bliss | Apr. 25, 1933 |
| 2,074,943 | Sharp | Mar. 23, 1937 |
| 2,196,685 | Schultz | Apr. 9, 1940 |
| 2,214,242 | Blocker | Sept. 10, 1940 |
| 2,657,764 | Sharp | Nov. 3, 1953 |
| 2,776,729 | Piros | Jan. 8, 1957 |